Figure 1:
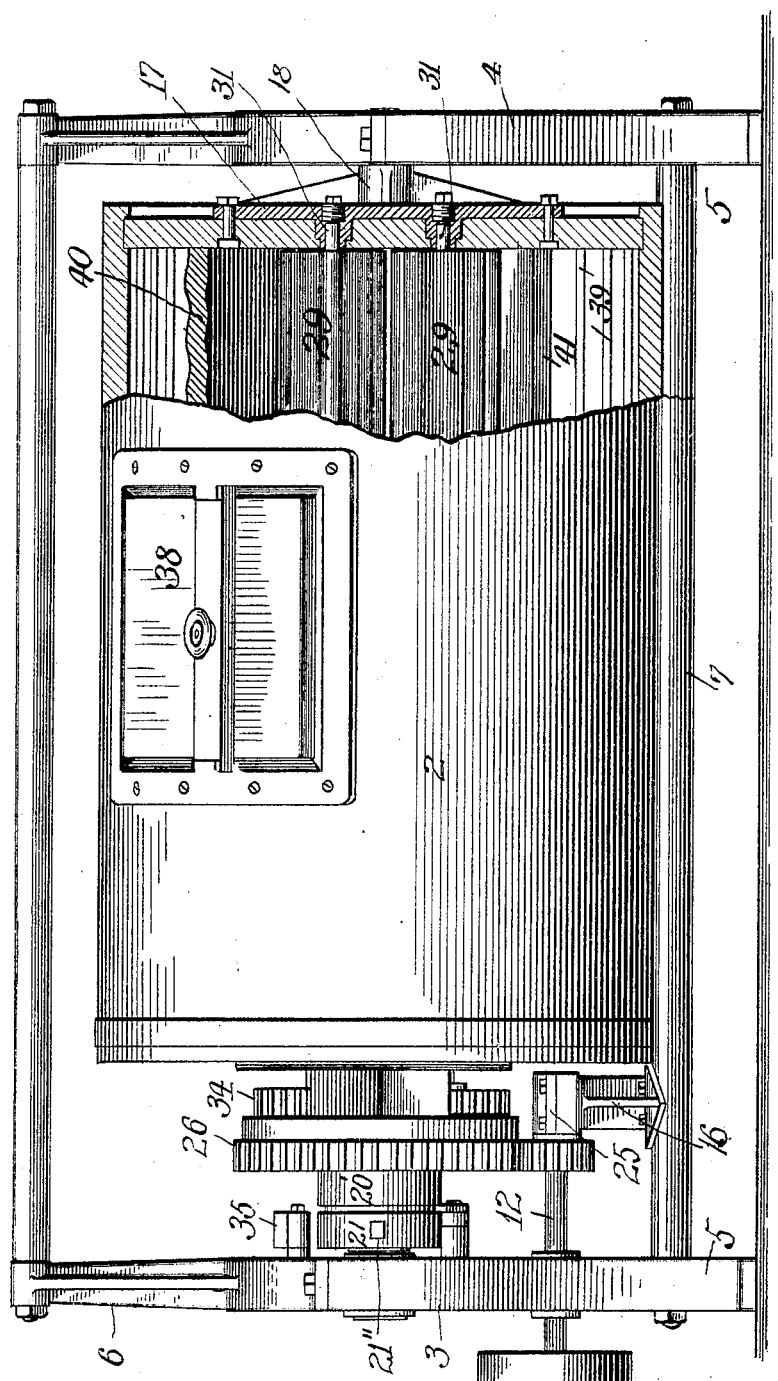

No. 803,035. PATENTED OCT. 31, 1905.
T. L. VALERIUS.
COMBINED CHURN AND BUTTER WORKER.
APPLICATION FILED JAN. 24, 1903.

5 SHEETS—SHEET 1.

Witnesses:
Inventor
Theodore L. Valerius

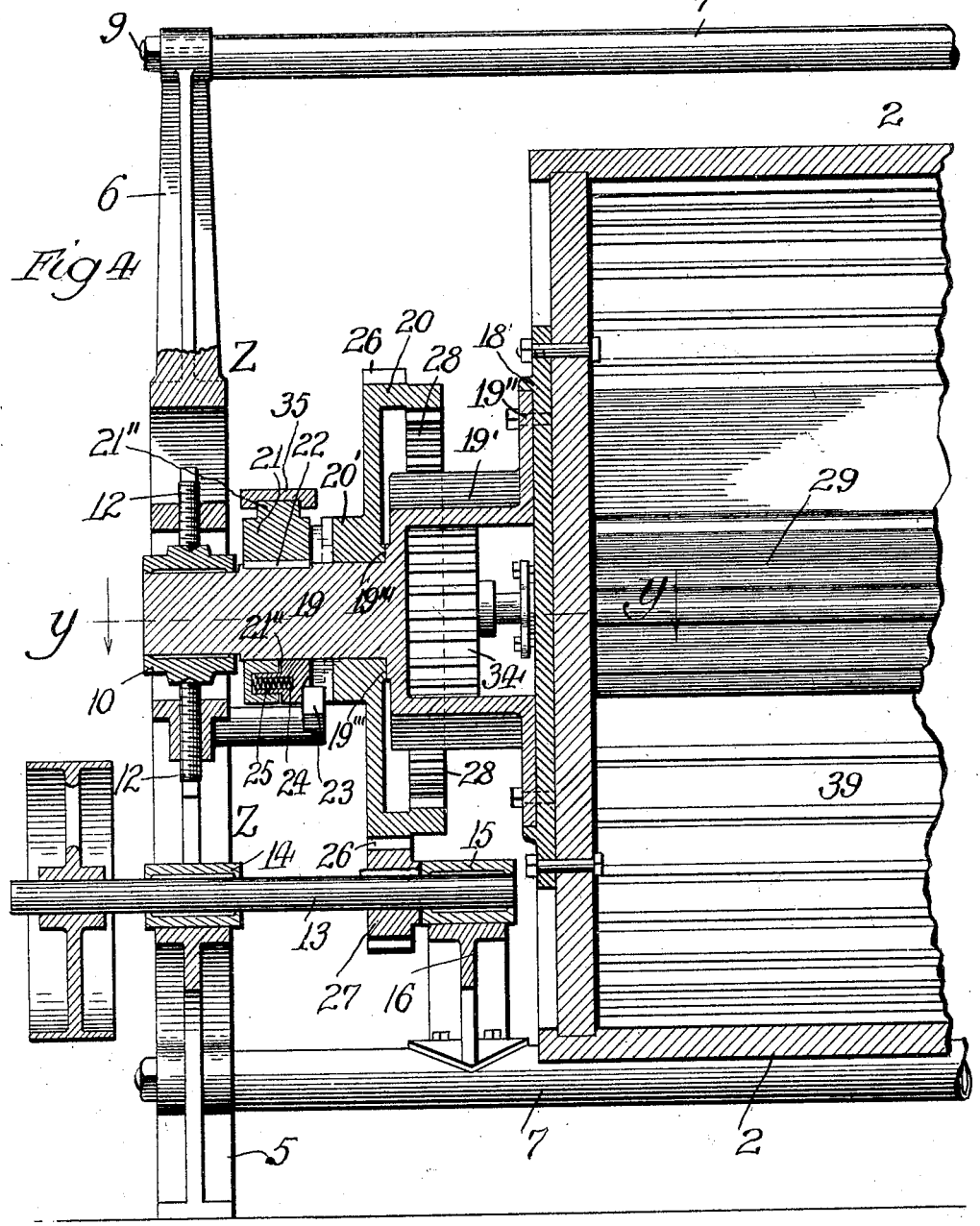

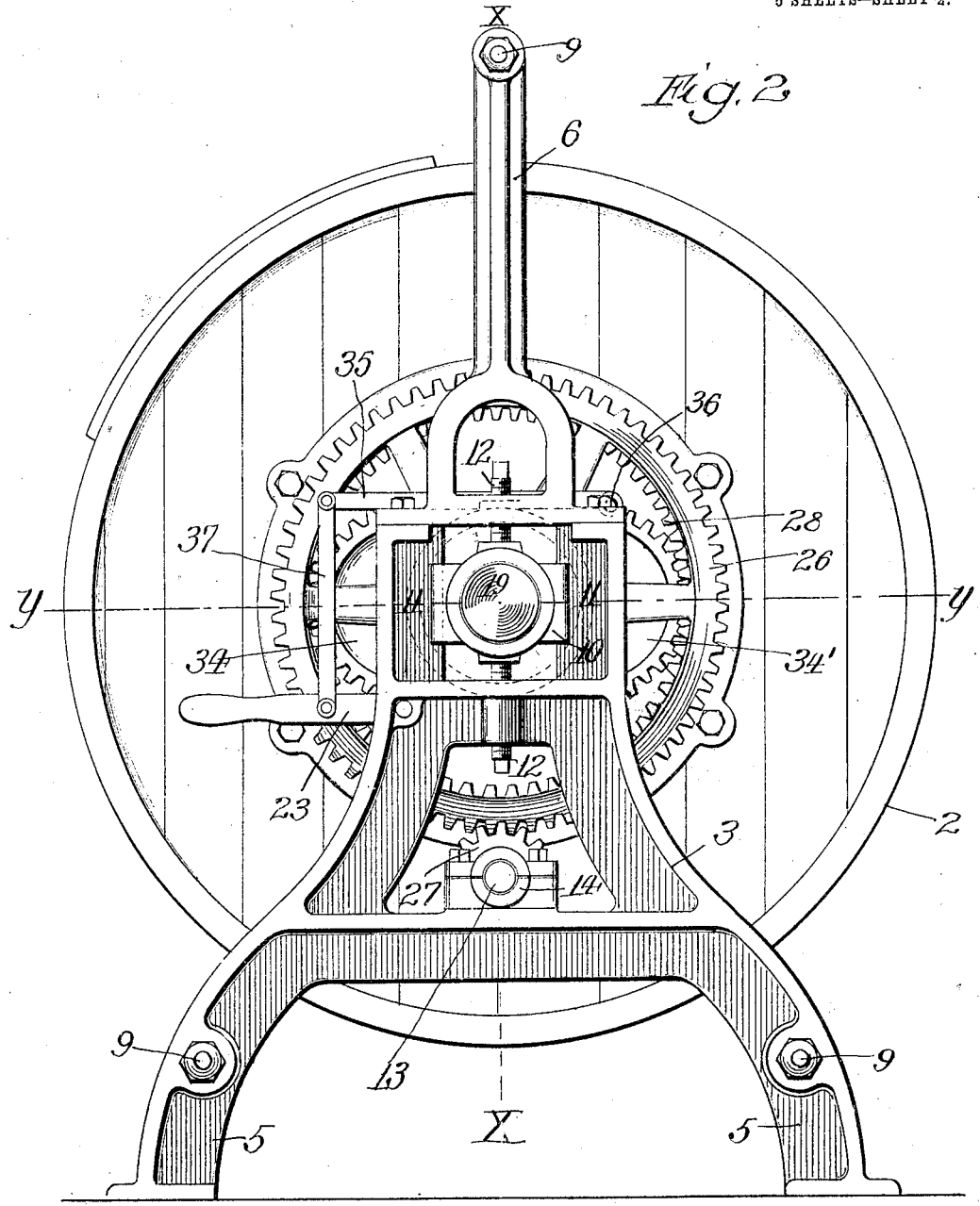

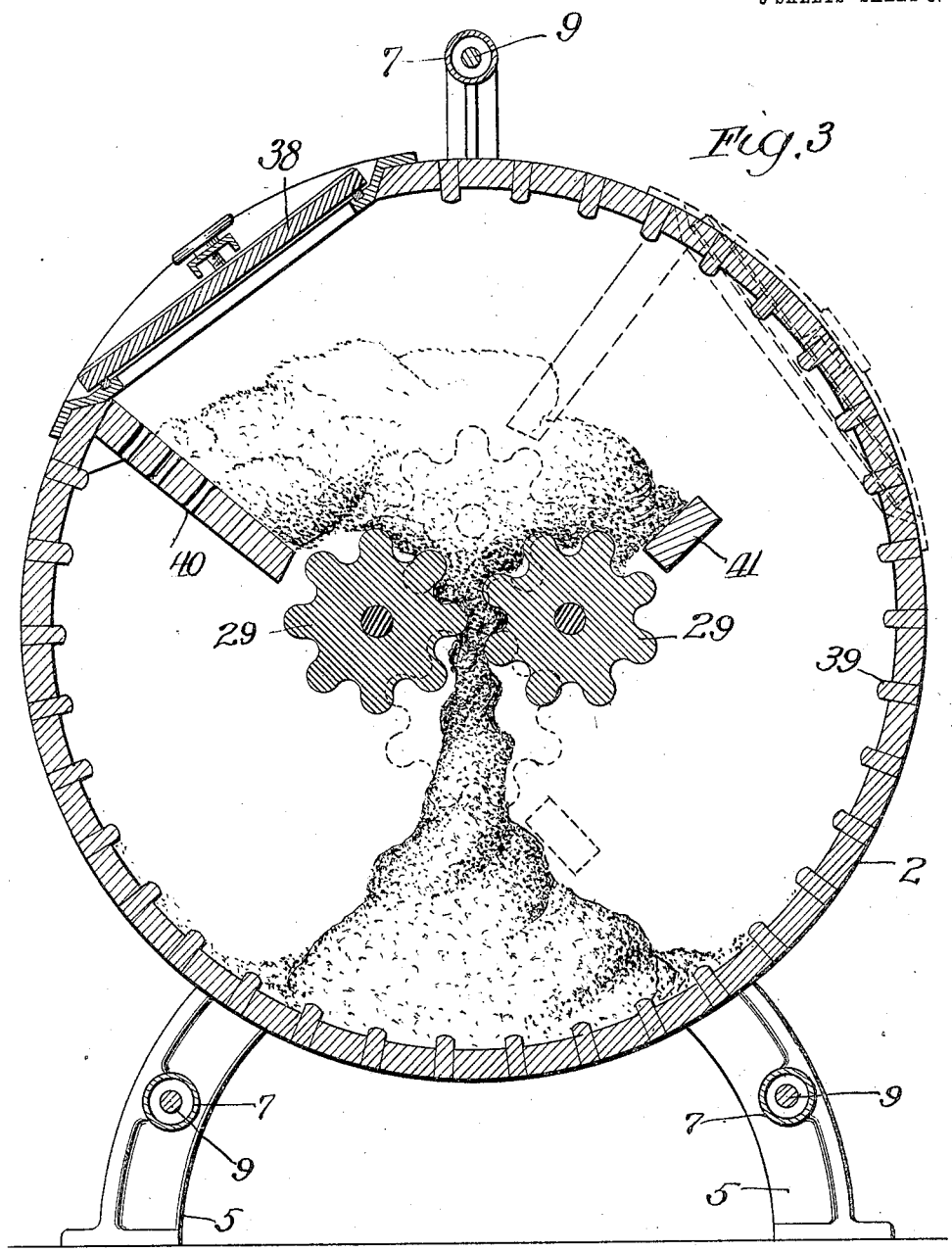

No. 803,035. PATENTED OCT. 31, 1905.
T. L. VALERIUS.
COMBINED CHURN AND BUTTER WORKER.
APPLICATION FILED JAN. 24, 1903.
5 SHEETS—SHEET 5.
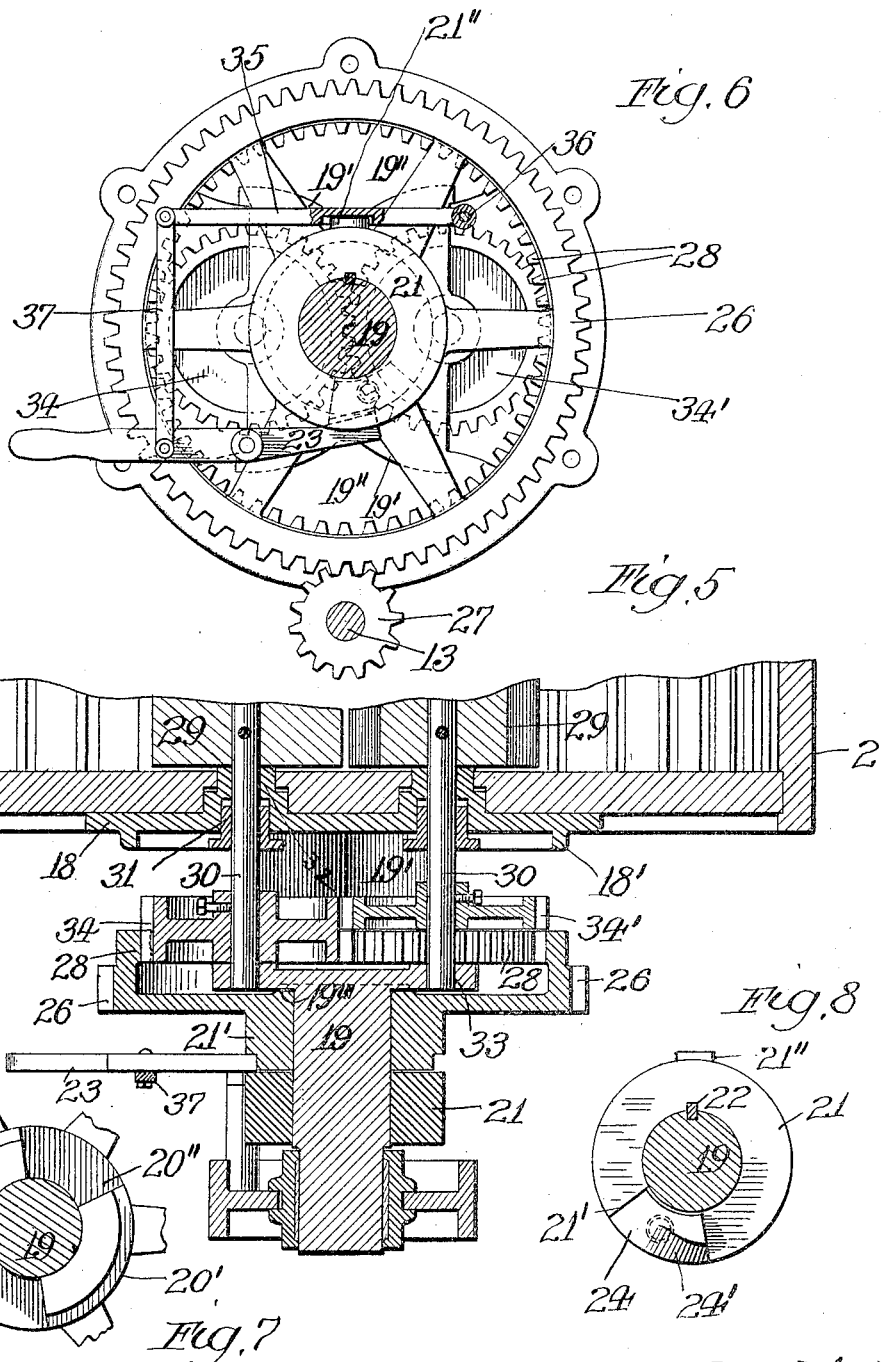

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

COMBINED CHURN AND BUTTER-WORKER.

No. 803,035.     Specification of Letters Patent.     Patented Oct. 31, 1905.

Application filed January 24, 1903. Serial No. 140,391.

*To all whom it may concern:*

Be it known that I, THEODORE L. VALERIUS, residing at Fort Atkinson, Jefferson county, Wisconsin, have invented a certain new, useful, and Improved Combined Churn and Butter-Worker, of which the following is a specification.

My invention relates to butter-churns and butter-workers, and relates particularly to improvements upon those machines in which the butter is both churned and worked. In such machines, which are usually rotary, the cream is first churned by the rotation of the machine and then after the buttermilk is drawn off the continued rotation of the machine operates to work or mass the butter granules and the butter is finished before it is removed from the machine, the salting of the butter being done meantime. The combined butter churns and workers which are now manufactured and in general use are of complicated and costly construction and lack durability. A churn of the class most in use comprises a rotary drum to contain the cream and butter and which is provided with internal rolls or members for working the butter after it is churned. Such a churn-drum is rotated constantly during the churning and working operation, and the butter-working rolls are driven either continuously or intermittently, their action being varied in different machines. Still other machines have been devised wherein partial intermittent rotation is imparted to the drum, as well as to the rolls, during the butter-working period. In all of the machines the operation of the drums and rolls is secured through the medium of complicated movements, clutches, and trains of gears, which in each case are interposed between the end of the drum and the bearing or journal which supports the same. In many machines trains of gears are used at both ends of the drum. In most of the present machines these parts rotate with the drum or are carried thereby, thus necessitating their arrangement between the drum ends and the bearings thereof and making the distance between those parts so great that all parts must be made very strong and heavy that they may have sufficient strength to support the great weight of the churn-drum when it is filled and in operation. Again, many of the churns and butter-workers are so geared that the gears which drive the drums at the comparatively high speed of churning cannot be employed directly for the lower speeds of working the butter masses— that is, the churning speed of the drum may be and is high; but in working butter it is undesirable to subject it to the sudden blows and falls within the drum that would result from such high speed, and it is therefore necessary to provide still another set of gears for rotating the drum at a lower speed. Furthermore, if the speeds were the same much more power would be required to drive the drum during butter-working than during churning, inasmuch as during the churning operation the drum rotates, so to speak, around the body of cream, while during the working operation the masses of butter are elevated by the flights upon the inner periphery of the drum, subjecting the gearing to a heavy load. From this fact it has followed that in all combined machines the speed of the working-rolls driven in train with the drum is much lower than need be. The rolls could operate more rapidly without effecting the quality of the product, except for this speed limitation imposed by their connection with the slowly-rotating drum. Thus while the present machines are admirable in performance as to their product their mechanical performance and construction I conceive to be poor and unnecessarily complicated, their cost to be exorbitant, and their life short.

Believing, therefore, that it is possible to simplify the construction and operation of combined churns and butter-workers, lessen their cost, increase their capacities, and give them durability, the object of my invention is to provide a machine of this class in which the speeds of the drum and the rolls shall be better proportioned, in which a minimum number of gears shall be used, in which the necessity for continuously rotating the drum during the working operation shall be avoided, which shall be of comparatively light weight and large capacity, which shall be close-coupled to its bearings, and which shall be of low cost with regard to both manufacture and maintenance. To this end I employ a horizontal churn-drum, suitably supported for rotation and containing working members or rolls, the driving-gears for which are upon the end of the drum. With these I associate a driver that is concentric with the drum, but may revolve with respect to it, and a chuck or clutch for connecting the driver to the drum for the rotation of the latter. The working gears are preferably engaged with the driver at all times and do not rotate while the drum is in operation. In this simple form I provide a combined churn and butter-worker the drum of which is rotated continuously during the churning of the cream and which is given only occasional revolutions during the butter-working operation to elevate the butter, the whole mass of butter being passed through the rolls, working at high speed while the drum is stationary, before the next butter-elevating revolution is imparted to it.

Broadly defined, my invention consists in the combination of the revolubly-supported drum, with the butter-working rolls thereon, and a mechanism for either rotating the drum or rotating said rolls after any single complete revolution of the drum and preferably stopping the rolls before the drum begins a revolution.

More specifically defined, my invention consists in the combination of the churn-drum having an internal dasher or flight and supported for rotation upon its horizontal axis, with the butter-working rolls in the drum, the working gears of said rolls, a driver revoluble about said horizontal axis of the drum and comprising internal and external gears, the former actuating the working gears, a clutch for connecting said driver with the drum for rotating the drum, and a motor-pinion meshing with the external gear of the driver and operating the same continuously; and my invention consists, further, in various details of construction and in combination of parts, all as hereinafter described, and particularly pointed out in the claims.

The invention will be more readily understood by reference to the accompanying drawings, forming a part of this specification, and in which—

Figure 1 is a side elevation of a combined churn and butter-worker embodying my invention, a portion of the drum being broken away to show its interior and the butter-working rolls. Fig. 2 is an enlarged end view of the machine. Fig. 3 is an enlarged transverse section of the machine, illustrating the butter-working operation. Fig. 4 is a vertical longitudinal section substantially on the line $x\ x$ of Fig. 2. Fig. 5 is a horizontal section substantially on the line $y\ y$ of Figs. 2 and 4. Fig. 6 is a detail end view of the driving mechanism as seen from the line $z\ z$ of Fig. 4; and Figs. 7 and 8 are detail views of the clutch that is arranged between the driver and the shaft or gudgeon on the churn-drum, Fig. 7 showing the clutch part on the driver and Fig. 8 representing the part keyed to the shaft or gudgeon.

As shown in the drawings, my machine is of the horizontal kind or type, and the churn drum or cylinder 2 is supported and journaled in a horizontal frame. This frame comprises the end standards 3 and 4, which are substantially triangular in form, each having the wide-spreading legs 5 and a top extension 6, which extends above the churn-drum. The standards are joined by the three horizontal tubes or pipes 7, all being bound together rigidly by the binder-rods 9, extending through the tubes. An extremely simple, light, strong, and cheap frame is thus provided for the heavy drum. The standards contain the journal-boxes 10, that are guided by the integral columns 11 of the standards and are adjustable by means of the large set-screws 12 above and below the boxes. These are used for leveling the drum and alining the same with the motor-shaft 13. The motor-shaft has a bearing 14 on the standard 3 and another bearing 15 upon the arch 16, that is sprung across the lower bars or tubes 7. The drum or cylinder 2 is provided with stud-shafts or gudgeons upon its ends and journaled in the boxes 10 of the standards. The rear end of the drum runs close to the standard 4. A larger and yet comparatively small space is left between the other end of the churn-drum and the standard 3 for the four gears and the clutch. The rear end of the churn has a central plate 17, that is provided with a short gudgeon 18, journaled in the standard 4. The gudgeon at the forward end necessarily takes a different form in order that the gears may be accommodated. For convenience I make the central plate 18 and the gudgeon 19 in separate parts, the latter having the spreaders 19', provided with broad feet or flanges 19'', bolted to the plate 18. The flanges 19'', as shown in Figs. 4 and 6, conform to the annular rib 18' of the plate 18, which, with the bolts, makes the connection with the drum rigid.

20 represents the driver, which, with the clutch part or collar 21, is arranged between the breast 19''' of the gudgeon and the box or bearing 10. The collar or part 21 is secured to the shaft or gudgeon 19 by a key 22; but the driver 20 is loosely journaled upon the gudgeon. The driver-hub or clutch part 20' faces against the collar 21 and is provided with two clutch-block recesses 20'', though it need have but one recess 20''. The hub 20' is also provided with a groove or shoulder 20''' as a guide for the clutch-operating lever 23. The abutting face of the collar 21 has a recess 21', in which is located the clutch-block 24, behind which is a spring 25, that tends to project the block into the recesses 20'' of the driver when the parts come opposite. When the clutch-block is thus projected, it interlocks with the driver, and as the collar is keyed to the drum-shaft the drum will rotate with the driver. The driver is provided with the external gear 26, with which the rapidly-rotating motor-pinion 27 meshes. As the driver is large, it is obvious that the drum will be slowly rotated as long as the clutch-block remains in engagement with the driver. This is the speed for both churning and working and, governed by the size of the drum, will range from sixty to one hundred revolutions per minute, it being understood that during the working process the rotation of the churn is limited to an occasional single revolution. The driver is also provided with an internal gear 28 for driving the pair of butter-working rolls 29 29 within the drum. These rolls are fluted, as shown in Fig. 3, to compress, work, or mass the butter that passes between them. The rolls are provided with shafts 30 30, fixed therein and which have blind bearings 31 in the plate 17 at the rear end of the drum and have open stuffing-box bearings 32 in the plate 18 on the forward end of the drum. The shafts 30 also preferably extend forward and have bearings 33 in the breast 19''' of the gudgeon piece or casting. The working-gears 34 34' are fixed on the shafts 30 30 between the breast of the gudgeon and the end of the drum. These gears mesh and are preferably each half the diameter of the internal gear 28 of the driver. It is obvious that both could not mesh with the internal gear, and therefore the working gear 34 is provided with a wide face, so that one side meshes with the internal gear 28 and the other with the companion working gear 34', which does not otherwise engage the driver. In this manner the gears 34 34' and the working rolls 29 29, respectively, are made to rotate in opposite directions whenever the drum is held against rotation, at which time the driver will be in rotation about the axis of the drum.

To stop the drum, it is necessary to retract or drive the clutch-block in the collar 21 out of engagement with the driver. This is accomplished by means of the clutch-lever 23, which, as shown, is pivoted on the standard 3. The clutch-block 24 (see Figs. 4 and 8) is provided with an incline or wedged surface 24', and when the lever is allowed to assume the position shown in the drawings the clutch-block will in rotating encounter the end of the lever 23, which will wedge the block back into the collar and free it from the driver. At the same moment the collar 21, the gudgeon, and the drum will be locked against rotation by the engagement of the lug 21'' with the locking or latch lever 35, which is pivoted on pin 36 in the standard 3. The apparently sudden stopping of the drum in this manner does not result in a severe shock, for the reason that the mass of butter will at this moment overhang the axis of the drum, as will be better explained hereinafter, and for the further reason that the clutch-lever 23 and the wedge-block have a braking action upon the drum. If desired, I may in large churns cushion the locking-lever 35 so that it will first yield slightly and then return the same and the drum to the normal stopping position. The moment the drum is stopped and the driver allowed to run free it will instantly start the butter-working rolls 29 and, as will be evident, rotate the same at twice the speed theretofore attained by the churn, inasmuch as each revolution of the driver will give two revolutions to the rolls. I am thus able to operate the working rolls at a high speed without sacrificing the speed of the drum. The levers 23 and 35 are preferably connected by a link 37, and to again start the drum in rotation it is only necessary to lift the outer end or handle of the lever 23. This frees the clutch-block 24, and the same will snap into the driver-hub as soon as one of the recesses 20'' therein arrives opposite the block. The working rolls and gears are fixed in the drum, and when the driver picks up the drum-clutch the parts rotate together, the working rolls being stopped with relation to the drum.

The wooden drum is provided with a suitable door 38, through which it may be filled and emptied, and is also provided with suitable means for drawing off the liquid contents. The inner periphery of the drum is provided with a large number of low cleats 39 to assist in the agitation of the cream during the churning process. The drum has one large flight or dasher 40, preferably perforated, which extends from the lower edge line of the door 38 to a point close to the adjacent working rolls 29.

41 is a narrow cross-board extending from end to end of the drum, located above the side of the opposite roll 29 and adapted to prevent the masses of butter from rolling over the side of the roll that is remote from the door in the side of the drum.

The relations of the flight 40, the clutch-block 24, and the stop-lug 21'' are fixed, and the flight 40 will always occupy the position shown in Fig. 3 when the stop-lug 21'' engages the stop or locking lever 35. This can only occur after a complete revolution of the drum, and hence during the working of the butter the mass of butter will always be found lodged upon the top of the working rolls when the drum stops. At this time the butter will slide down the then inclined flight 40, and as the working rolls will be in rapid rotation the butter will be quickly passed downward between them, all thereof being allowed to pass and fall upon the bottom of the drum before the lever 23 is lifted to permit another elevating revolution of the drum. During such a revolution the butter will roll in the bottom of the churn until the flight 40 comes to pick it up. From that moment until the churn comes to a stop the mass of butter is a load upon the driving-gear; but as the weight of the mass starts from the lowest position in the churn, in which position it is least resistant to rotation, the driving-gear is not subjected to a sudden load shock and the churn takes up its movement before the heaviest lifting strain is encountered. It will be noted that the larger portion of the mass of butter thus elevated overhangs the axis of the drum on the side of the flight 40 at the moment when the churn is brought to a stop, and hence the weight of the butter, as before intimated, counteracts the momentum of the drum and minimizes the shock upon the lock or latch and upon the bearings of the machine. In churning, the drum is partly filled with cream and being closed is rotated, all parts within the churn assisting in the agitation of the cream during rotation.

The complete operation of my combined churn and butter-worker will be understood from the foregoing and need not be here repeated. Likewise the numerous advantages of my invention will be evident from the foregoing.

As numerous modifications of my invention will readily suggest themselves to one skilled in the art, I do not confine the invention to the specific constructions, arrangements, operations, and uses herein described.

Having thus described my invention, I claim as new and desire to secure by Letters Patent—

1. A combined churn and worker comprising, in combination, a churn-drum, supported for rotation upon its horizontal axis, suitable working members within said drum, means for driving said drum and said members, and means preventing the operation of said members during the operation of said drum and vice versa, substantially as described.

2. A combined churn and worker comprising, in combination, a suitable drum supported for rotation upon its horizontal axis, the working members within the drum, a driver common to said drum and members, and means whereby the same is caused to actuate said drum or said members, but not both, at will, substantially as described.

3. A combined churn and worker comprising, in combination, a suitable churn-drum, working members within said drum having a working gear upon the exterior of the drum, a driver revoluble with respect to the drum, for actuating said working gear and members with relation to the drum, and means for coupling said driver to the drum, to rotate the latter, substantially as described.

4. A combined churn and worker comprising, in combination, a horizontal drum supported for rotation, a driver revoluble about the axis of the drum, a clutch for connecting the driver and drum, and working members operated by said driver when the driver is disconnected from the drum, substantially as described.

5. A combined churn and worker comprising, in combination, a horizontal rotary churn-drum, working members having bearings in the walls of said churn, a working gear connected therewith and a driver, engaged with said working gear and revoluble with said drum or with relation thereto, at will, substantially as described.

6. A combined churn and worker comprising, in combination, a horizontal rotary churn-drum, working members therein, a working gear connected with said members, a driver engaged with said working gear and revoluble with said drum or with relation thereto, at will, and means for stopping the drum at a predetermined point in its revolution, substantially as described.

7. A combined churn and worker comprising, in combination, the horizontal drum mounted for rotation, the working rolls having bearings in the heads of said drum, the working gears of said rolls, and means for driving said drum and gears non-simultaneously, substantially as described.

8. A combined churn and worker comprising, in combination, the horizontal drum having central gudgeons whereby it is mounted for rotation, the working rolls extending longitudinally of the drum and mounted in the heads thereof, and a single driver concentric with the drum for alternately and automatically operating the drum and the rolls, substantially as described.

9. A combined churn and worker comprising in combination, a horizontal drum mounted for rotation the working rolls extending between and mounted in the heads of said drum and a single drum and roll driver engaged with said rolls and concentric with the drum, for operating the drum and the rolls, said driver being constantly connected with said rolls and a driver-clutch also concentric with the axis of the drum, for coupling the driver to the drum or disconnecting the same therefrom, substantially as and for the purpose specified.

10. A combined churn and worker comprising, in combination, the horizontal drum mounted for rotation, the working rolls within the drum, the driver mounted for rotation about the axis of the drum and connected with said working rolls, means for coupling the driver to the drum, a butter-gathering flight provided in said drum, and means for stopping the drum when said flight is above said rolls, substantially as described.

11. A combined churn and worker comprising, in combination, the horizontal drum mounted for rotation, the butter-working rolls mounted for bodily rotation with said drum, but revoluble therein, the flight coöperating with said rolls within the drum, means for driving said rolls and said drum, and means for stopping said drum, after any complete revolution thereof and thereupon instantly rotating said rolls and vice versa, substantially as described.

12. A combined churn and worker comprising, in combination, the horizontal drum mounted for rotation, the working rolls mounted in said drum, the working gears of said rolls, the driver having internal and external gears mounted for rotation about the axis of said drum, the internal gear being engaged with said working gears, a clutch for coupling said driver to the drum, and a motor-pinion engaged with said external gear, substantially as described.

13. A combined churn and worker comprising, in combination, a horizontal churn-drum provided with gudgeons at its ends, suitable supports therefor, the working rolls mounted in said drum, a single flight provided in said drum, the rotated driver mounted upon the gudgeon of the drum and geared to said rolls, and a clutch for coupling the driver to said gudgeon, substantially as described.

14. A combined churn and worker comprising, in combination, a horizontal churn-drum provided with gudgeons at its ends, suitable supports therefor, the working rolls mounted in said drum, a single flight provided in said drum, the rotated driver mounted upon the gudgeon of the drum and geared to said rolls, a clutch for coupling the driver to said gudgeon, and means for disengaging the driver and stopping the drum, at will, substantially as described.

15. A combined churn and worker comprising, in combination, the horizontal drum, the gudgeons thereof, the parallel, longitudinal working rolls having bearings in the ends of said drum, the wide flight fixed with relation to said rolls in the drum, means rotating said drum continuously or imparting single complete revolutions thereto, means for stopping the drum after a complete revolution and means driving said rolls when the drum is stopped, whereby the butter, which is lifted by a single elevating revolution of the drum, will be passed between said rolls and worked, substantially as described.

16. A combined churn and worker comprising, in combination, the churn-drum and working members, the breasted gudgeon of the churn, the gears of said members, a collar fixed upon said gudgeon, a driver provided upon the gudgeon, between the collar and the breast of the gudgeon, and engaged with said gears, a clutch for connecting the driver with said collar and suitable clutch-operating means, substantially as described.

17. In a machine of the class described, the combination, of the drum and its gudgeons, with the standards wherein said gudgeons are journaled, bars connecting the lower parts of the standards and a bar extending between the standards above said drum, substantially as described.

18. In a machine of the class described, the churn-drum and the gudgeons thereof, in combination, with the substantially triangular standards wherein said gudgeons are journaled and the three connecting-bars extending between the standards, one thereof being above said drum, substantially as described.

19. In a combined churn and worker, the combination, of a churn-drum with a plurality of rotating members therein, and suitable driving mechanism intermittently connected with said drum and constantly connected with said members, substantially as described.

20. In a combined churn and worker, a horizontal, rotating drum in combination with a pair of longitudinal rolls mounted within the drum, a flight in the drum adjacent to the rolls, driving mechanism for rotating the drum through one or more revolutions, a driving-pulley provided with internal gears for actuating said rolls in opposite directions, and clutch mechanism for checking the revolutions of the drum at a point where said flight is inclined downwardly toward said rolls, so that the butter may fall therefrom between the rolls, substantially as described.

21. In a combination churn and worker, a drum in combination with working devices therein, means driving said drum, means for driving said devices, and automatic means stopping said devices when the drum is operated and vice versa, substantially as and for the purpose specified.

In testimony whereof I have hereunto set my hand, this 20th day of January, 1903, in the presence of two witnesses.

THEODORE L. VALERIUS.

Witnesses:
H. H. CURTIS,
CHAS. W. FERRIS.